United States Patent [19]
Fan et al.

[11] Patent Number: 5,386,486
[45] Date of Patent: Jan. 31, 1995

[54] CONNECTING SYSTEM FOR FIELD INSTALLATION AND CLEANING

[75] Inventors: Robert J. Fan, Canoga Park; Douglas A. Parker, Camarillo, both of Calif.

[73] Assignee: LiteCom, Inc., North Hollywood, Calif.

[21] Appl. No.: 791,661

[22] Filed: Nov. 7, 1991

[51] Int. Cl.⁶ ............................ G02B 6/36; G02B 6/38
[52] U.S. Cl. ................................ 385/59; 385/71; 385/75
[58] Field of Search ............... 385/59, 71, 53, 55, 385/56, 58, 790, 75, 76, 77

[56] References Cited
U.S. PATENT DOCUMENTS

| | | | |
|---|---|---|---|
| 3,951,514 | 4/1976 | Medina, Jr. | 385/55 |
| 4,140,366 | 2/1979 | Makuch et al. | 385/59 |
| 4,140,367 | 2/1979 | Makuch et al. | 385/59 |
| 4,182,546 | 1/1980 | Lukas et al. | 385/59 |
| 4,277,135 | 7/1981 | Schrott et al. | 385/59 |
| 5,133,032 | 7/1992 | Salter et al. | 385/59 |
| 5,265,182 | 11/1993 | Hartley | 385/77 |

*Primary Examiner*—Frank Gonzalez

[57] ABSTRACT

A connector system designed for reliable easy field maintenance in which a connector pin terminus and connector socket terminus have a single or multiple optical fibers. When the connector pin terminus and connector socket terminus are connected the optical fibers form mated pairs. A releasable insert surrounding the connector socket termini allows the tip ends of the optical fibers in both the connector plug half and connector receptacle half to be exposed for maintenance when they are separated. The releasable insert is secured to the connector socket fixed insert by a spring-loaded shaft having a cross-pin at one end and a screw driver or other type of slot in the opposite end.

17 Claims, 4 Drawing Sheets

CONNECTING SYSTEM FOR FIELD INSTALLATION AND CLEANING

FIELD OF THE INVENTION

This invention relates to connecting systems for field operations and more particularly relates to fiber optic connecting systems having removable inserts.

BACKGROUND OF THE INVENTION

Connecting systems and in particular fiber optic connecting systems present significant installation and maintenance problems. There are especially problems with field cleaning. Installation techniques include fiber-cable preparation, termination of the fiber in the pin or socket. terminus (or wire in pin or socket contact) and insertion of the termini contacts in the connector housing. Typically, there is some cleaning to be done to the terminus or contact after the fiber is secured in place and the cleaning can be done prior to the insertion of the terminus or contact in the connector half. Hereafter, the term pin terminus for fiber can also be a pin contact for electrical connecting and the term socket terminus for fiber can also be a socket contact for electrical connecting.

Maintenance problems involve the need to be able to clean the connector after it has been installed and used for a period of time. Whether the connector is fiber optic or electrical, a single-channel (one terminus pair which when joined together represent a single optical fiber line for signal transmission) or a multi-channel connector (multiple number of fiber-optic termini pairs) there is some cleaning which is necessary for field applications. In multi-channel connectors, there is usually a pin terminus on one side of the mated connector pair and a socket terminus on the other side of the mated connector pair. The pin terminus is typically protruding from the pin insert which contains the plurality of pin termini and is therefore relatively easy to clean without any special treatment.

The socket terminus is typically recessed within the alignment bushing in the socket insert which contains the plurality of socket termini. Since these are recessed they are not easily accessible for cleaning which requires not only cleaning of the end face of the fiber in the terminus but also requires cleaning of the alignment bushing cavity. There are situations in field applications where the connector halves can be exposed to mud and debris when uncoupled and unmated. Under these circumstances the alignment bushing can be filled or partially filled with contaminants and it can be very difficult to be certain of getting all the contaminating material out even if some can be removed. In fiber-optic interconnections the mating fibers must be totally clean and free of any contaminants, even the smallest particles can significantly degrade the signal and thus introduce unacceptable losses to signal transmission.

There is the possibility of removing the termini completely from the connector half and cleaning them outside. However, this is very impractical since the connector half typically has an accessory backshell which is difficult to remove and may even be sealed by long use and not removable at all. Furthermore the termini must be removed with the use of a special removal tool which is difficult to use and can tear up the fluorosilicone rubber insert with repeated insertions and removal of the termini. The whole procedure of removing the termini each time the connector half is cleaned, is time consuming, difficult and totally unacceptable for field maintenance conditions.

Multi-channel connectors usually have some rigorous accelerated aging tests applied for qualification and they can experience some similar rigorous adverse environmental and mechanical conditions in field applications. Because of this, the connector insert must be capable of withstanding severe conditions, yet maintaining the integrity of the connector construction.

While a few single channel connectors are designed with identical pin termini brought together slidingly within a precision alignment element that can be easily cleaned since both termini can be removed, there are other single channel connectors which are actually small shell-size plug and receptacle connectors like the larger, multi-channel counterparts. These experience the same difficulty in cleaning in field applications as do the multi-channel connector systems.

A special type of multi-channel connectors is the hermaphroditic connector. This connector has identical connector halves which have both protruding pin termini and recessed socket termini. The interface arrangement is usually such that when one of the connector halves is brought into position having a common center line with the other identical connector half and are brought together in an orientation where they are each 180° displaced from the other half, the connector halves meet and are matable. To couple the connector halves together, the coupling ring on one of the connector halves is used to bring forward and mate to the other connector half.

The basic problem with these connectors is to maintain the integrity of the connector while somehow providing for a means to clean the connector socket termini in the recessed alignment bushing cavities. This means that whatever is designed as an improvement to provide means of field cleaning must be as rugged as the connector in which the design is introduced, both mechanically and environmentally.

It is one object of the invention to provide a connector system for field applications that is easy to clean.

Another object of the present invention is to provide a connector system for field application that is mechanically and environmentally rugged.

Another object of the present invention is to provide a connector system that is easy to clean but maintain the integrity of the connector system.

Yet another object of the present invention is to provide a connector system that is easy to clean, rugged in construction and applicable to single-channel, multiple channel, hermaphroditic, plug/receptacle, plug/feedthrough/plug or other connector mechanism.

BRIEF DESCRIPTION OF THE INVENTION

The purpose of the present invention is to provide a connector system for field applications that is applicable to all types of connectors, is rugged and is easy to clean in the field.

In typical connector systems male and female connector halves when brought together and coupled bring the terminus in each connector half together. A multi-channel connector usually has a socket terminus which includes a precision alignment bushing in the cavities of a socket insert. The coupling mechanism will have a plug connector half and a receptacle connector half. A pin insert or socket insert can be positioned on either the plug side or the receptacle side.

Preferably the invention has a mated pair of multi channel connector halves with a removable socket insert in one connector half and a pin insert on the other connector half. The terminus in the plug and receptacle are essentially identical. The pin terminus is slidingly brought to the socket terminus through an alignment bushing fixed on the socket terminus in the socket insert. The ends of the termini come into abutting position assuring the fibers in pin and socket termini are precisely aligned and the fiber ends are abutting.

When the connector pair of the connector system are uncoupled and the termini are unmated as the connector halves are pulled apart, the pin termini protrude from the pin insert which may have a fluorosilicone rubber grommet seal and the ends of the fiber tips are easily reached for cleaning. The termini in the socket half of the connector are recessed with the fiber tips located slightly beyond halfway through the alignment bushing. The fiber tip ends are inaccessible for proper cleaning and inspection. Any attempt to thoroughly clean the ends of the termini tips would be a tedious and difficult if not impossible task. Further there is no way to assure that the ends of the fiber tips are actually clean and that some debris accumulated around the periphery of the ends of the terminus tip may remain because the ends are not easy to see.

However, in the device of the present invention a section of a socket insert forming cavities housing the alignment bushing is removable to expose the terminus tip ends. The insert can be provided with a spring-loaded release mechanism that assures integrity under harsh environmental and mechanical conditions a connector must withstand to meet stringent specifications. The insert is recessed so it does not interfere with the coupling of the connector halves or the mating of the termini pair. The release mechanism in a multi-channel connector is provided by a spring-loaded shaft having a drive slot or other recess at the opposite end that is necessary for rotating the shaft with a screw driver or similar rotational drive tool. While a screw driver slot is preferred because a blade screw driver is a very common tool other types of recesses such as a hexagonal or cross-shaped for use with an Allen wrench or Phillips screw driver respectively may be used.

When the removable socket insert is in position it is locked in place by the spring-loaded release mechanism that holds the removable socket insert on the fixed socket insert and surrounding the socket termini of the socket connector half.

To release the socket insert after uncoupling the plug and receptacle, a screw driver is placed in the screw driver slot in the end of the release mechanism shaft. By pressing axially inward toward the socket connector half while rotating the release mechanism shaft 90° the cross-pin at the end of the shaft is released from a nested position in a recess in the socket connection half unlocking the insert. The cross-pin may then pass through open slots in the fixed insert of the socket connector half allowing the removable socket insert to be removed exposing the fiber tip ends for maintenance.

Preferably the removable socket insert has protruding posts that engage holes in the fixed socket insert that prevent the removable insert from rotating away from a correct radial orientation. Desirably the protruding posts or the surface of the releasable insert which abuts the fixed insert may also include a compression spring feature that assists in separating the releasable socket insert from the fixed socket insert as the release mechanism is rotated to a release position. This can also help in finding the release position of the cross-pin which is hidden from view. As the cross-pin reaches a release through-slot the compressing spring beneath the orientation posts will "pop" it out of the slot.

The release mechanism is retained in the releasable insert portion of socket terminus by the cross-pin in the end of the shaft which extends beyond the surface of the releasable insert. The shaft passes through a hole in the center of the releasable insert. The hole has a counterbore or larger diameter at one end allowing a spring to be positioned between the head of the shaft and the shoulder formed in the through hole. The "spring" could be a compressible resilient material.

The same system applies to other multi-channel connectors, single channel connectors and hermaphroditic connectors. In any case and especially the latter case the release pin may be offset from the center of the releasable insert. The releasable socket insert and the release mechanism can be incorporated into any of the popular single and multi-channel connector styles. Thus the removable insert is easily removed taking with it the precise alignment bushings, exposing connector terminus ends for cleaning and maintenance. With the releasable insert separated from the connector half, the socket termini exposed protruding from the fixed insert and the alignment bushings in the removable insert portion, can be flushed out and thoroughly cleaned also. The release mechanism is rugged, reliable and easy to use to assure that a high standard of environmental and mechanical strength are maintained.

The above and other novel features and advantages of the invention will be more fully understood from the following detailed description and accompanying drawings in which:

DETAILED DESCRIPTION OF THE INVENTION

Figure 1:
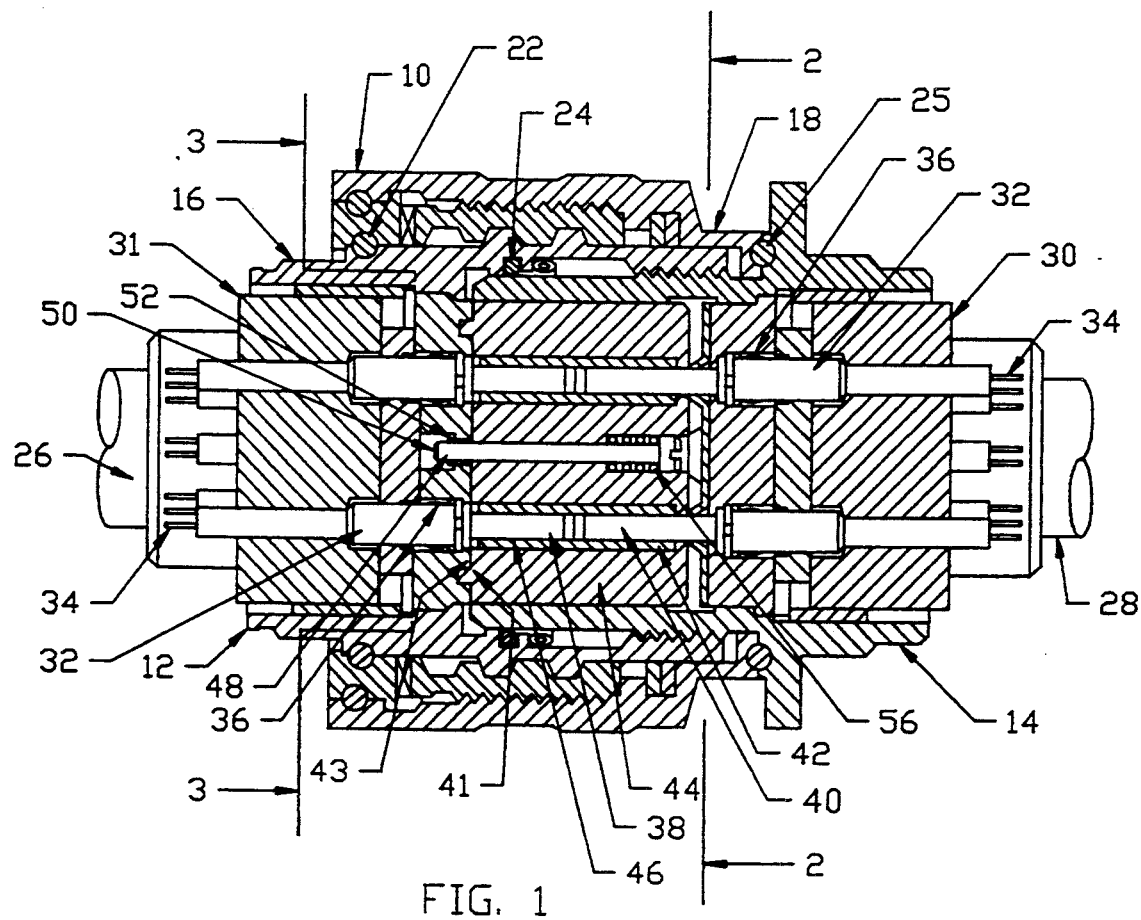
FIG. 1 is a sectional view of a typical multi-channel plug and receptacle mated connector pair according to the invention.

A connector system 10 is shown generally in FIG. 1. Most of the parts shown are standard parts used in connectors for field applications. The connector system is comprised of a plug connector half 12 and a receptacle connector half 14. Each of the connector halves have a mating shell 16 and 18 which interlock and are sealed by O-ring seals 20, 22 24, and 25 to keep out dust, debris and moisture. The connector halves 12 and 14 are used to connect cable 26 and 28 which may have light-conducting fiber optic transmission lines. The connector shells, inserts and other parts are standard parts found in a connector such as a Military Standard Model Number D38999/40FF11PN-D38999/46FF11SN.

Receptacle connector half 14 has a fixed insert 30 comprised of three parts. The three parts cooperate to hold termini body 32 for receiving light-conducting fiber optic transmission lines 34. Each terminus body is held in place between the sections of the fixed insert 30 by retaining clips 36. The fixed insert 30 and retention clip 36 are standard in these connectors.

The plug connector half 12 also has a fixed insert 31 in three sections similar to that shown in the receptacle insert 30. Fixed insert 31 has a face 41 adjacent removable insert face 43. The plug connector half also includes the terminus body 32 and retaining clips 36 for aligning light-conducting fiber optic transmission lines 34.

As can be seen in FIG. 1 fiber-optic termini or tip ends 38 and 40 pass through alignment bushings 42 in insert 44 in the plug connector half 12. The light-conductor termini 38 and 40 must come into abutting relationship to assure maximum transmission. A common problem with these types of connectors is cleaning the end faces of termini 38 and 40 when the connector halves 12 and 14 are uncoupled and the light-conducting tip ends are unmated. On the receptacle connector 14 termini 40 will be exposed when the connector is uncoupled and therefore these tip ends will be relatively easy to clean without any special treatment. However, on the plug connector side 12, termini 38 are usually recessed in the insert and not easily accessible for cleaning. It is imperative that the end faces of termini 38 be cleaned and also that the alignment bushing cavity 46 be free of contamination. Even the smallest amount of debris can reduce transmission or even damage the end faces when the connector is re-coupled.

In field applications where the connector halves may be uncoupled, they may be exposed to mud and debris. The alignment bushing cavity 46 can then be possibly filled with contaminants and it may be difficult to remove these contaminants completely. A small amount of contaminants in the alignment bushing cavity 46 can significantly degrade the signal and thus introduce unacceptable losses to signal transmission.

Therefore to provide a connector system which is easy to maintain in field application where special tools are not always available, insert portion 44 has been designed to be removable to expose the end faces of light-conducting tip ends 38. Removable socket insert 44 fits between plug connector half 12 and receptacle connector half 14 and is secured to plug connector half 12 by locking pin 48 fitting into locking cavity 50 in fixed socket insert 31. Locking pin 48 has a locking post 52 on the end to secure the removable insert 44 over the socket terminus tip 38 in plug connector half 12.

Figure 2:
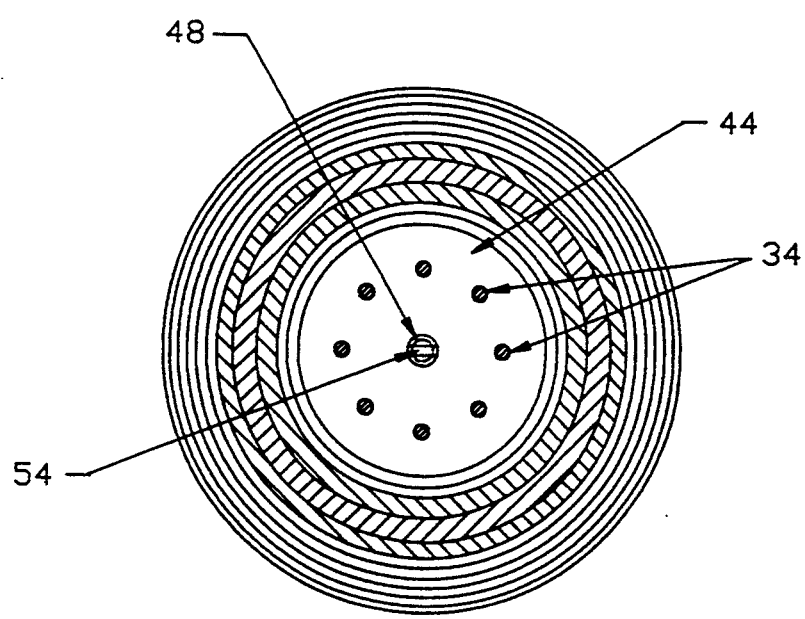
FIG. 2 is a sectional view taken at 2—2 of FIG. 1.

As can be seen more clearly in FIG. 2, Locking pin 48 is provided with screw driver slot 54 (or other recess configuration) to allow the locking pin to be easily rotated. Locking pin 48 is spring-loaded by spring 56. The removable insert 44 is released by inserting a screw driver in slot 54 and rotating pin 48 while pressing axially.

Figure 3:
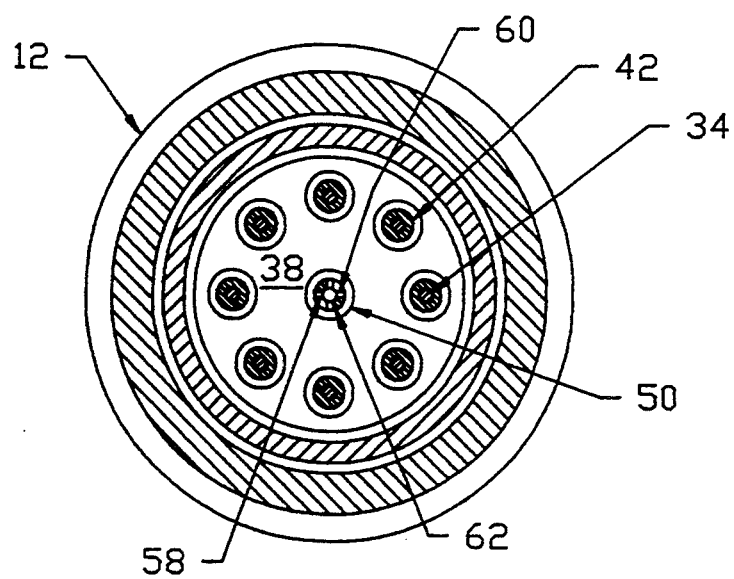
FIG. 3 is a sectional view taken at 3—3 of FIG. 1.

Post 52 locks removable insert 44 to fixed insert 31 by nesting in recesses 58 and 60 (FIG. 3) in locking cavity 50. Slot 62 in fixed insert 31 allows post 52 to pass through the face of fixed insert 31 into cavity 50 and be seated in recesses 58 and 60. The planes or transition areas between slot 62 and recessed seats 58 and 60 may be angled to provide a "ramp" 51 that urges post 52 on locking pin 48 toward a nested position. Thus when the removable insert is being re-attached all that need be done is axially press locking pin 48 and rotate slightly to position post 52 on a "ramp" 51 which will force the post toward recessed slots 58 and 60 and a nested, locked position.

Figure 4:
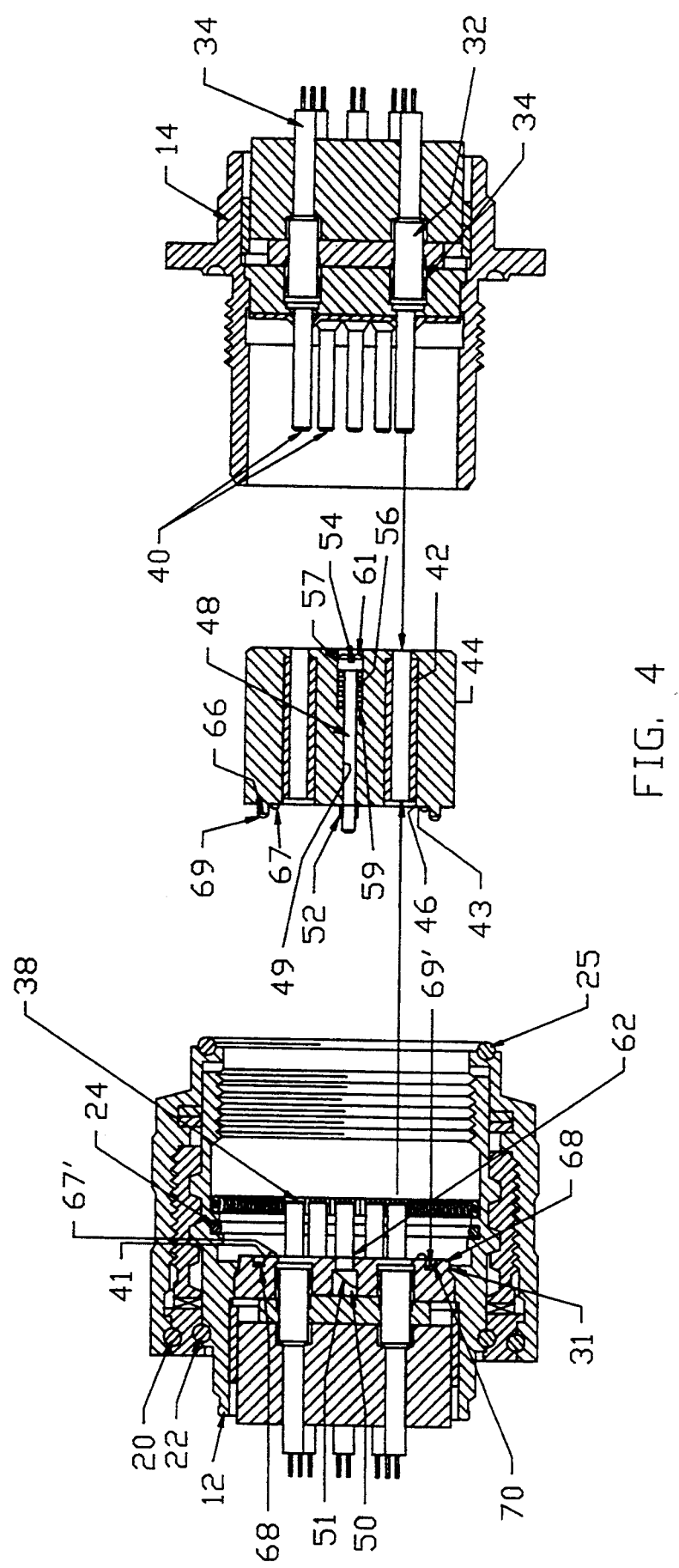
FIG. 4 is an exploded view of the connector system of FIG. 1.

The separation of the respective connector parts is shown more clearly in FIG. 4. Locking pin 48 is held in bore 49 in removable insert 44 by post 52 passing through the end of pin 48. Locking pin 48 is provided with a spring release by coil spring 56 positioned in counter-bore 57 providing a shoulder 59 to hold spring 56 beneath head 61 of pin 48.

To attach removable insert 44 light-conducting fiber optic termini 38 are inserted in alignment bushings 42 and insert 44 is pushed downward until post 52 on locking pin 48 engages slot 62 providing access to locking cavity 50 in fixed insert 31. To lock removable insert 44 into plug connector half 12, a screw driver is inserted in slot 54 and locking pin 48 is pressed axially until post 52 passes through slot 62 into cavity 50. Pin 48 is then rotated 90° allowing post 42 to nest in recess seats 58 and 60 in locking cavity 50 in fixed insert 31. To expose light-conducting tip ends 38 and 40 the connectors are uncoupled with the tip ends unmated.

Removable insert 44 is detached by reversing the procedure described above. That is a screw driver is placed in slot 54 and locking pin 48 is pressed axially and rotated 90° until post 52 is aligned with through slot 62 in locking cavity 50. This releases removable insert 44 allowing it to be separated from plug connector half 12 exposing light-conducting termini 38 as an assist in separating removable insert 44 from adjacent fixed insert face 41, resilient compressible means 67, 67' and/or 69, 69' may be added located between fixed rear insert face 41 and removable insert face 43 or between aligning pins 66 and aligning holes 68. This also allows the cavities 46 and bushing 42 interior to be thoroughly cleaned of debris or contaminants.

Proper alignment is also assisted by pins 66 formed on the bottom face of removable insert 44 which engage aligning sockets 68 in the face of fixed insert 31. To assist in separating the removable insert 44 resilient compressible springs 70 can be provided between pin 66 and aligning socket 68. Resilient compressible springs 70 can be coil springs, bellville washers or any suitable compressible member that will assist in pushing removable insert 44 away from fixed insert 31.

Thus to clean light-conducting termini 38 and 40 in the field, plug connector half 12 and receptacle connector half 14 can be uncoupled which will expose plug light-conducting termini 40. To expose socket light-conducting termini 38, removable insert 44 is detached by releasing locking pin 48. The end faces of light conducting termini 38 and 40 may now be easily cleaned as can the cavities in removable insert 44.

Figure 5:
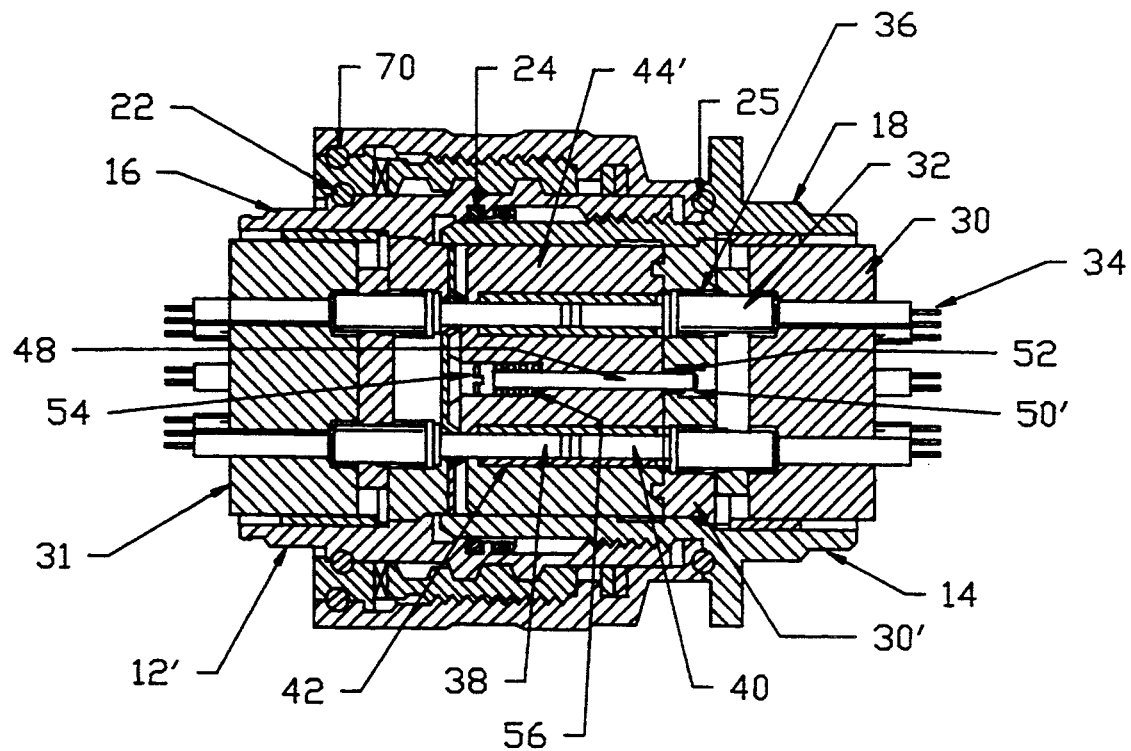
FIG. 5 is a sectional view similar to FIG. 1 with a removable insert on the opposite connector end.

Removable insert 44 can be applied to either half of the plug and receptacle connecting system as is shown in FIG. 5. Here removable insert 44' is connected to the receptacle connector half 14' in the same manner as it was connected to the plug connector half 12 described previously. Plug connector half 12' then has light-conducting tip ends 38 that will be exposed when the two connector halves are uncoupled. Removable insert 44 may then be detached from receptacle connector half 14' by releasing locking pin 48 from locking cavity 50' in fixed insert 30' as described previously.

Figure 6:
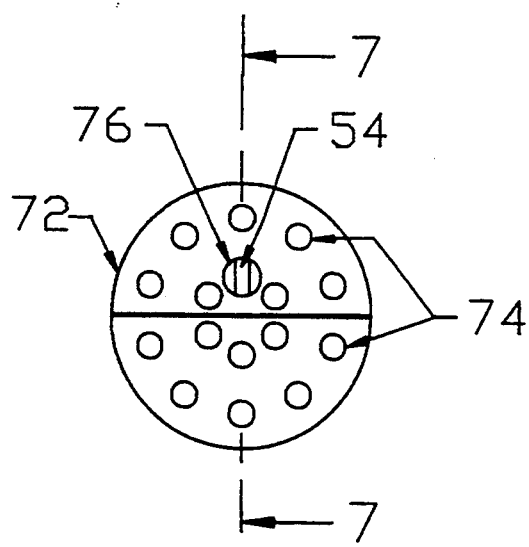
FIG. 6 is an end view of an insert suitable for use with a connector, especially a hermaphroditic connector system.
Figure 7:
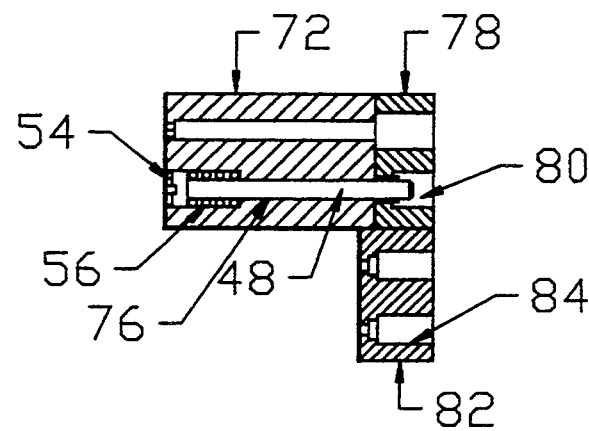
FIG. 7 is a sectional view of a removable insert for a connector, especially a hermaphroditic connector taken at 7—7 of FIG. 6.

The technique of using a removable insert for field maintenance is also applicable to "stepped" connector inserts especially hermaphroditic connectors by utilizing a "stepped" or hermaphroditic insert as shown in FIGS. 6 and 7 in which the standard connector parts are omitted for clarity. A hermaphroditic connector is a special type of multi-channel connector. This connector has identical connector halves which have both protruding pin termini and recessed socket termini. The interface arrangement is usually such that when one of the connector halves is brought into position having a common center line with the other identical connector half and they are each 180° displaced from the other half, the connector halves will then meet and are matable.

An end view of inserts 72 for use in a hermaphroditic connector is shown in FIG. 6. The hermaphroditic connector has holes 74 for receiving light conducting fiber optic termini. Each insert will also have a counter bored hole 76 for receiving locking pin 48 (FIG. 1) to lock the insert to the connector.

Figure 8:
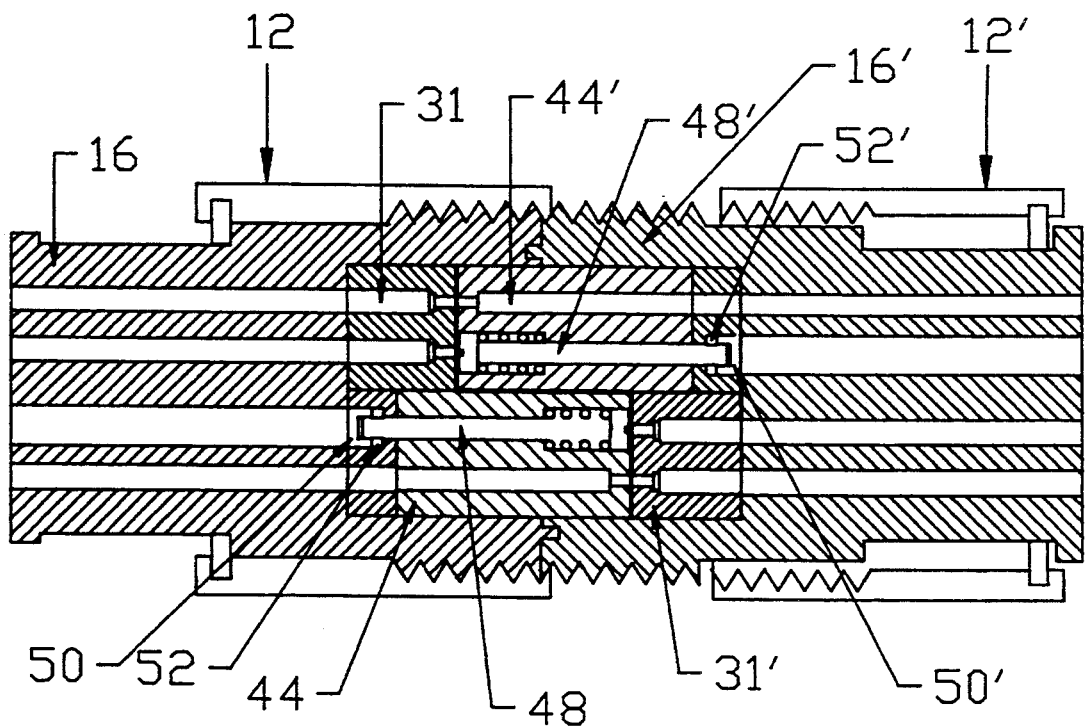
FIG. 8 is a sectional view of a typical hermaphroditic mated connector pair according to the invention.

The typical hermaphroditic connector is shown in FIG. 8 with identical connector halves each being made elements similar to those of the plug and receptacle halves in FIG. 1. The hermaphroditic connector has mating shell 16 or 16', connector half 12 or 12', insert 31 or 31', locking cavity 50 or 50', post 52 or 52', removable insert 44 or 44', and locking pin 48 or 48'. This may be a multi-channel or single-channel. hermaphroditic connector.

The connection of the half-circle shaped hermaphroditic insert 72 is shown in greater detail in FIG. 7. The hermaphroditic insert 72 will connect to the fixed insert 78 of a connector as before with locking pin passing through counter bored hole 76. The post on the locking pin will fit into locking cavity 80 in fixed insert 78 of one side of a hermaphroditic connector. A similar half cylindrical hermaphroditic insert will be attached to the other side of the hermaphroditic connector. The other side 82 of fixed insert 78 in a "stepped" or hermaphroditic connector mechanism (not shown) will have pin termini extending through 84, the ends of which will be exposed. Thus to expose the light-conducting termini tip ends, the hermaphroditic connector will be uncoupled as shown previously in FIG. 4 which will expose the tip ends in the side 82 of fixed insert 78 that are already exposed. Hermaphroditic removable inserts 72 on each end will then be removed by releasing locking pin 48, separating the removable insert 72 from the fixed insert 78 of the connector. The removable insert 72 for hermaphroditic connectors is similar to removable insert 44 being split into two halves with one half connecting to each side of the hermaphroditic connector.

Thus there has been described a connector system having an easily removable insert for use in field applications. The removable insert can be easily detached from the connector allowing the light-conducting termini end faces to be easily cleaned. The removable insert itself can also be easily cleaned. No special tools are required and it can be done quickly and easily. For hermaphroditic connectors there will be two half-cylindrical inserts, one connected to each side that will operate in the same manner as the full cylindrical insert.

As a further alternative, the transition area between the recesses for receiving post 52 can be ramped as in FIG. 4 ramp 51 to urge the post into the recesses. Thus when the locking pin and post are passed through the open slot into the cavity and are rotated slightly the area between the open slot and the seats formed by the recesses will tend to urge the post into the recesses.

This invention is not to be limited by the embodiment shown in the drawings and described in the description which is given by way of example and not of limitation but only in accordance with the scope of the appended claims.

What is claimed is:

1. A connector system comprising;
   a connector pin terminus having at least one first optical fiber conductor passing there through;
   a connector socket terminus having at least one second optical fiber conductor passing there through;
   connecting means for connecting said connector pin terminus and said connector socket terminus thereby forming at least one corresponding optical fiber conductor pair upon mating; and
   a releasable insert means positioned surrounding said connector pin terminus and connector socket terminus when said connecting means is mated;
   whereby the tip end of said at least one corresponding optical fiber conductor pair in said mating pin and socket termini may be exposed for maintenance when said connector pin terminus and said connector socket terminus are separated during separation of said connecting means after which said releasable insert is removed to expose the socket terminus end for cleaning and examination.

2. The connector system according to claim 1 in which said connector pin terminus and said connector socket terminus are respectively positioned in a mating multi-channel plug and receptacle.

3. The connector system according to claim 1 in which said connector pin terminus and said connector socket terminus are each positioned in a half of a mating multi-channel hermaphroditic connector.

4. The connector system according to claim 1 in which said releasable insert is positioned surrounding said socket Serial terminus and secured in place by a spring-loaded retaining mechanism capable of being adjusted to release the releasable insert.

5. The connector system according to claim 4 in which said retaining mechanism comprises a shaft passing through said releasable insert having a transverse-mounted locking post at one end and an enlarged head at the other end to capture the releasable insert; a tool-receiving recess in said shaft head; a resilient means for spring loading said shaft such that the spring force urges the releasable insert to press against a surface of a fixed rear insert; and a locking cavity in said connector fixed rear insert for receiving said shaft end and transverse-mounted post to lock said releasable insert to said fixed rear insert of an insert assembly in a plug or receptacle connector half when said shaft is rotated.

6. The connector system according to claim 5 in which said shaft head tool-receiving recess is a screw driver slot.

7. The connector system according to claim 5 in which said shaft head tool-receiving recess is a hexagonal slot.

8. The connector system according to claim 5 in which said shaft head tool -receiving recess is a cross-cut screw driver slot.

9. The connector system according to claim 5 in which a resilient means for spring loading said retaining mechanism comprises a coil compression spring surrounding said shaft and located beneath the head of said shaft and pressing against the releasable insert on one end and against the underside of said shaft head on the other end simultaneously.

10. The connector system according to claim 5 in which said connector insert assembly includes; aligning pins on said releasable insert face adjacent said surface of fixed insert, and mating aligning holes in said surface of the fixed rear insert adjacent said releasable insert face; whereby said aligning pins fit closely in said aligning holes to assure proper orientation of connector insert portions.

11. The connector system according to claim 10 with additional resilient compressible means located between said fixed connector rear insert face adjacent said removable insert face so as to assist in separating said connector insert portions when it is desirable to release said releasable insert.

12. The connector system according to claim 11 in which said resilient compressible means comprises a compressible spring member in said alignment holes pressing simultaneously against the alignment holes in one insert portion and against said aligning pins of the other insert portion.

13. The connector system according to claim 5 in which said connector fixed insert portion has a slot for passing said post transverse-mounted through the shaft into said locking cavity; and transition areas from said slot into said locking cavity being angled or ramped to provide a means to urge said post and said shaft towards said fixed insert when shaft is rotated thus drawing the releasable insert towards the fixed insert and maintaining such relationship until desirable to release the releasable insert.

14. The connector system according to claim 1 further comprising more than one pin terminus and/or more than one socket terminus.

15. The connector system according to claim 1 in which said connector pin terminus and said connector socket terminus are respectively positioned in a mating multi-channel receptacle and plug.

16. The connector system according to claim 1 in which said connector pin terminus and said connector socket terminus are each positioned in a half of a mating single-channel hermaphroditic connector.

17. The connector system according to claim 5 in which said connector insert assembly includes; aligning pins on said fixed insert face adjacent said surface of removable insert, and mating aligning holes in said surface of the removable insert adjacent said fixed rear insert face; whereby said aligning pins fit closely in said aligning holes to assure proper orientation of connector insert portion.

* * * * *